March 29, 1949.

T. J. TUDOR 2,465,669

INSULATED PIPELINE UNION
FOR ELECTROLYSIS CONTROL
Filed July 18, 1947

Inventor
THOMAS J. TUDOR

By McMorrow, Berman + Davidson
Attorneys

Patented Mar. 29, 1949

2,465,669

UNITED STATES PATENT OFFICE 2,465,669

INSULATED PIPE-LINE UNION FOR ELECTROLYSIS CONTROL

Thomas J. Tudor, Ulysses, Kans.

Application July 18, 1947, Serial No. 761,827

1 Claim. (Cl. 285—17)

This invention relates to pipe unions and more particularly to an insulating union for use in high pressure pipe lines to minimize corrosion due to electrolysis in the pipe line.

A main object of the invention is to provide a novel and improved insulating pipe union which is very simple in structure, easy to install and which provides a secure liquid and gas tight joint.

A further object of the invention is to provide an improved insulating pipe union for electrically insulating adjacent pipe sections of a pipe line to thereby minimize corrosion of the pipe line due to electrolysis, said union involving inexpensive components and providing a secure mechanical connection between the adjacent pipe sections, yet effectively insulating the sections electrically from each other.

Further objects and advantages of the invention will become apparent from the following description and claim, and from the accompanying drawings, wherein:

Figure 1:
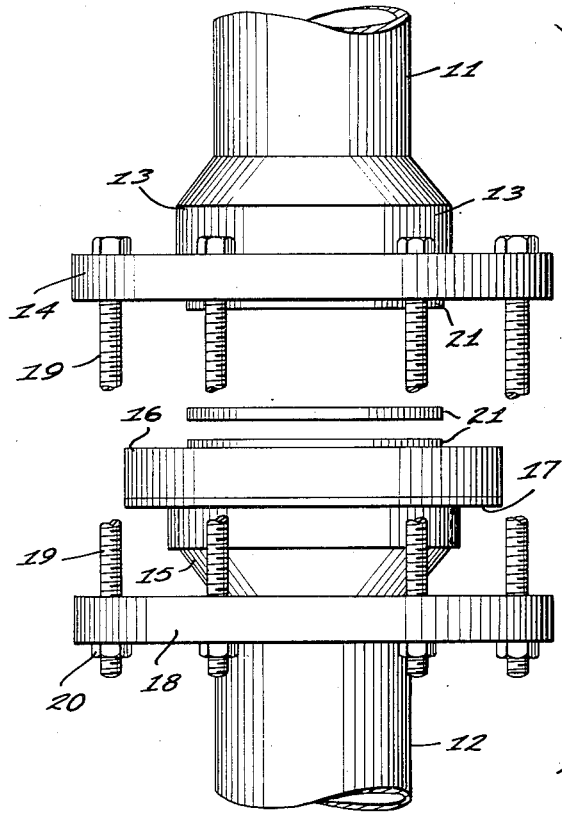
Figure 1 is an elevational view showing the component parts of a pipe union constructed in accordance with the present invention, said parts being shown in a dis-assembled condition.
Figure 3:
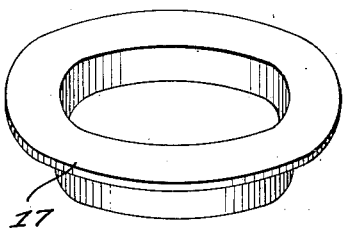
Figure 3 is a perspective detail view of a flanged insulating collar employed in the pipe union of Figure 1.
Figure 2:
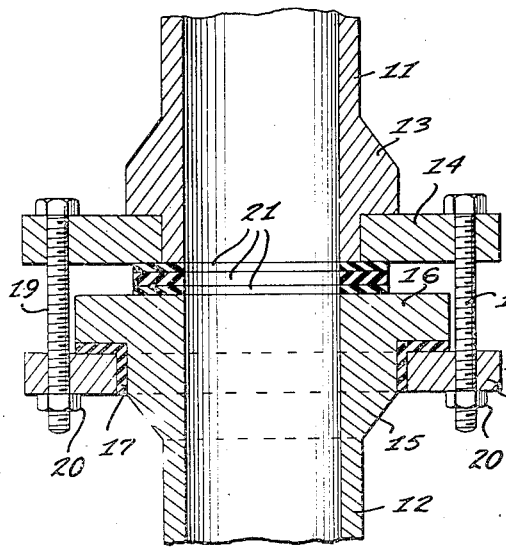
Figure 2 is a vertical cross-sectional view taken axially through the assembled pipe union of Figure 1.
Figure 4:
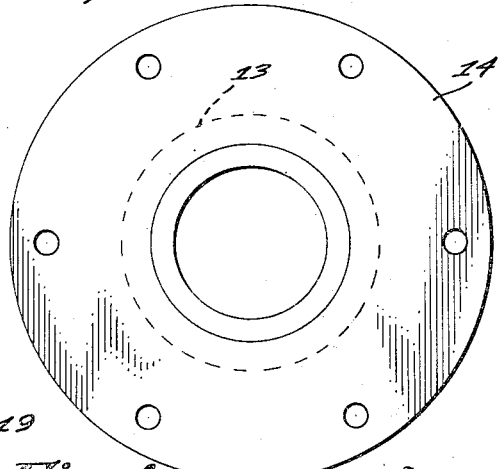
Figure 4 is a bottom view of the upper pipe section of Figure 1.

Referring to the drawings, 11 designates a first pipe section and 12 designates a second pipe section to be joined to pipe section 11. Pipe section 11 is enlarged at its end portion as shown at 13, and welded or otherwise rigidly secured to said enlarged end portion is a flange 14. Pipe section 12 is formed with an enlarged end portion 15 which is further enlarged at the end of the section opposite flange 14 of the adjacent pipe section to define a flange 16 somewhat smaller in outside diameter than that of flange 14. In the annular seat defined between flange 16 and the main annular body of enlarged portion 15 is positioned a flanged collar 17 of insulating material and bearing on collar 17 is a ring member 18 which is clamped to flange 14 by a plurality of bolts 19 passing through and uniformly spaced around the flange 14 and ring 18 and secured by nuts 20 threaded on the bolts.

Interposed between the opposing faces of flange 16 and flange 14 are a plurality of annular gasket rings 21 which are compressed by the bolts 19 to form a liquid and gas tight seal between the two pipe sections. Gasket rings 21 are of insulating material.

It is thus apparent that when the pipe sections are connected together by the structure above defined, said sections will be securely joined and at the same time will be electrically insulated from each other. Conduction of electrolysis currents from one pipe section to the next adjacent pipe section will therefore be prevented and corrosion of the pipe line will thereby be minimized. At the same time, a joint of high mechanical strength able to withstand high pressure is provided by the above structure.

Although a plurality of gasket rings 21 are shown in the specific embodiment illustrated in the drawings, a satisfactory joint according to the present invention may be obtained by employing only one such gasket ring.

While a specific embodiment of an insulated pipe joint for oil, gas or other fluid substances, has been disclosed in the foregoing description, it will be understood that various modifications within the spirit of the invention may occur to those skilled in the art. Therefore, it is intended that no limitations be placed on the invention other than as defined by the scope of the appended claim.

What is claimed is:

An insulated pipeline union of the class described comprising, a first pipe section having an enlarged end portion and a flange rigidly secured thereto, a second pipe section having an enlarged end portion and an integral flange carried thereby, said pipe sections being disposed in coaxial alignment with said flanges thereof adjacent one another, a gasket disposed between said flanges, the second flange and end portion providing right-angle faces, a flanged collar of insulating material in bearing engagement with said faces, a ring around said second pipe section and engaging the outer surfaces of said flanged collar, said second flange being of less diameter than the first flange and said ring being of substantially the same diameter as said first flange, a plurality of spaced bolts carried by said first flange and passing by said second flange and then entirely through said ring with parts projecting beyond the latter, and nuts on said projecting parts drawing said pipe sections together and compressing said gasket and collar.

THOMAS J. TUDOR.

REFERENCES CITED

The following references are of record in the file of this patent:

UNITED STATES PATENTS

| Number | Name | Date |
|---|---|---|
| 34,455 | Wilcox | Feb. 18, 1862 |
| 213,142 | Strater et al. | Mar. 11, 1879 |
| 426,121 | Gennert | Apr. 22, 1890 |
| 2,272,861 | Yohde | Feb. 10, 1942 |